US006863755B2

(12) United States Patent
Nedblake, Jr. et al.

(10) Patent No.: US 6,863,755 B2
(45) **Date of Patent: *Mar. 8, 2005**

(54) ON-DEMAND LABEL APPLICATOR SYSTEM

(75) Inventors: Greydon W. Nedblake, Jr., Captiva, FL (US); Lawrence E. Johnson, Gladstone, MO (US); Jules P. Farkas, Laguna Beach, CA (US)

(73) Assignee: LaserSoft Management, L.L.C., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/460,689

(22) Filed: Jun. 12, 2003

(65) Prior Publication Data

US 2003/0210943 A1 Nov. 13, 2003

Related U.S. Application Data

(63) Continuation of application No. 10/365,167, filed on Feb. 12, 2003, now Pat. No. 6,695,501, which is a continuation of application No. 09/852,532, filed on May 9, 2001, now abandoned.

(51) Int. Cl.[7] ................................................ B32B 31/20

(52) U.S. Cl. ......................... 156/64; 156/234; 156/248; 156/257; 156/267; 156/344

(58) Field of Search .......................... 156/61, 344, 504, 156/247, 234, 248, 249, 257, 238, 267, 268, 269, 273.3, 275.7, 289, 285, 361, 519, 521, 528, 534, 566, 567, 568, 370, 379

(56) References Cited

U.S. PATENT DOCUMENTS

| | | | | | |
|---|---|---|---|---|---|
| 5,082,520 | A | * | 1/1992 | West et al. | 156/450 |
| 5,300,160 | A | | 4/1994 | Wilson et al. | |
| 5,405,482 | A | | 4/1995 | Morrissette et al. | |
| 5,624,520 | A | * | 4/1997 | Nedblake et al. | 156/249 |
| 5,702,559 | A | * | 12/1997 | Bright | 156/450 |
| 5,776,297 | A | * | 7/1998 | Edwards et al. | 156/379 |
| 6,123,796 | A | * | 9/2000 | Kathmann et al. | 156/249 |
| 6,450,227 | B1 | | 9/2002 | Labardi | |
| 6,620,275 | B1 | * | 9/2003 | Avila et al. | 156/152 |

FOREIGN PATENT DOCUMENTS

| | | | |
|---|---|---|---|
| DE | 003143098 | A1 | 5/1983 |
| DE | 003152881 | A1 | 7/1983 |
| JP | 0051039 | | 12/1972 |
| JP | 404201835 | A | 7/1992 |
| JP | 405147636 | A | 6/1993 |
| JP | 406092336 | A | 4/1994 |
| JP | 406099961 | A | 4/1994 |
| JP | 406227534 | A | 8/1994 |
| JP | 411174630 | A | 7/1999 |
| JP | 020000203547 | A | 7/2000 |
| JP | 02001055212 | A | 2/2001 |

* cited by examiner

*Primary Examiner*—Chris Fiorilla
*Assistant Examiner*—George Koch
(74) *Attorney, Agent, or Firm*—Hovey Williams LLP

(57) ABSTRACT

Improved label printing and applying apparatus (10) is provided which includes an improved digital printing assembly (12) having a rotatable impression drum (18) presenting an outer surface (20), as well as at least one digital print head (22) adjacent the drum outer surface. The overall apparatus (10) also includes a downstream label cutting and application assembly (14) having an adhesive applicator (32), laser cutter (40) and a label applying device. In use, a web (16) traverses the drum (18) with essentially no relative movement between the web (16) and drum surface (20), and the print head(s) (22) are actuated to form images on the web (16), which may be identical or varied. Thereafter, the printed web passes into and through the assembly (14) where adhesive is applied, the individual images are laser cut, and the labels are thereupon applied to products (54).

13 Claims, 8 Drawing Sheets

ON-DEMAND LABEL APPLICATOR SYSTEM

RELATED APPLICATION

This is a continuation of application Ser. No. 10/365,167 filed Feb. 12, 2003, now U.S. Pat. No. 6,695,501 which is a continuation of application Ser. No. 09/852,532 filed May 9, 2001, now abandoned.

BACKGROUND OF THE INVENTION

1. Field of the Invention

The present invention is broadly concerned with label printing and applying apparatus, and corresponding methods, wherein images such as labels are successively printed on a continuous web using a relatively large rotating impression drum and associated digital print heads; thereafter, the printed web passes through a downstream adhesive applicator and a laser cutting and label application assembly where the individual printed images are laser cut and applied to products. More particularly, the invention is concerned with such apparatus and methods wherein use of an improved drum/digital print head printing assembly which permits high speed, on-demand production of images for labels or the like, using relatively inexpensive, thin, lightweight webs.

2. Description of the Prior Art

Traditionally, pressure sensitive labels have been produced using more or less standard, multiple-tower web-fed printing apparatus followed by mechanical die cutting of the individual labels. In such operations, it has generally been necessary to releasably adhere the printed web to a carrier sheet so as to permit die cutting of the labels. Once the labels are cut, the matrix is removed from the carrier, leaving the labels spaced on the carrier sheet which was then formed into a roll. Carrier sheets of this type typically represent nearly one half of the material cost of label production. This is a tremendous waste of resources, and the spent carrier sheets also present an on-going trash disposal burden, typically ending in landfills.

In response to these problems, it has been suggested in the past to employ laser cutting devices in lieu of traditional die cutting systems. Moreover, some laser cutting systems are "linerless" in that the use of carrier sheets is eliminated. For example, U.S. Pat. No. 5,681,412 describes a modern-day laser cutting label production system of this type.

While such laser systems are a significant advance in the art, some problems remain. For example, the upstream printing of label stock prior to laser cutting has not heretofore been seriously addressed in prior laser-based systems. That is, traditional printing methods, be they either web fed multiple-tower printers or even digital printing equipment, it is usually necessary to employ relatively thick webs having sufficient mechanical strength to withstand the printing operation. Rollers or other devices used to pull the webs through these printing units impose significant stresses on the webs, and if the webs are too thin or otherwise insufficiently strong, the webs have a tendency to break and/or elongate which is inimical to consistent quality printing. As a consequence, it has generally been necessary to employ web having a thickness of at least about 2 mils. These webs are relatively expensive, as compared with thinner webs of, e.g., 0.5 mil thickness.

It has also been suggested to avoid intermediate collection of printed and cut labels by use of in-line, complete systems wherein a starting label stock is printed, adhesive is applied, and the cut stock is applied to products. Here again though, these systems suffer from many of the foregoing problems. Furthermore, such complete systems lack desirable on-demand characteristics i.e., the use of conventional printing equipment makes it very difficult to rapidly shift between different types or styles of labels, and cannot produce infinitely variable label copy and shape.

SUMMARY OF THE INVENTION

The present invention overcomes the problems outlined above and provides improved label printing and application apparatus especially (although not exclusively) suitable for label making coupled with immediate in-line application of the labels to products. Broadly speaking, the label printing and applying apparatus of the invention includes a web printing assembly operable to print individual label images on a continuously moving web, where the images may be successive or identical, or variable image-to-image. The apparatus includes a rotatable impression drum presenting an outer surface and at least one (and usually plural) digital print heads adjacent the drum outer surface. A downstream web cutting and applying assembly including a laser cutter and a label application device also forms a part of the overall apparatus. Finally, a web guidance system operable to guide a continuous web around at least a portion of the drum surface and between the drum surface and print head(s) is provided, allowing printing of successive images on the web. In practice, with the apparatus of the invention, use can be made of relatively thin, inexpensive webs. This stems from the fact that during printing, the linear speed of the web and the speed of the impression drum surface are closely matched so that there is essentially no relative movement between the drum surface and web. Consequently, the web is stabilized during printing and is not subjected to undue tension or forces which would otherwise distort the web. By the same token, use of digital print heads and associated sensors permits very accurate registration printing so that high quality images can be produced.

In preferred forms, the print head may be inkjet or laser print head, or any other suitable digitally-controlled printing device. The impression drum is preferably rotatable in opposite directions as desired, so that either side of a web may be printed.

Various types of label-applying devices can be used in the invention, such as rotary or in-line units. The only qualification is that a given device be capable of picking up the successive laser cut label images and transferring onto respective products.

DETAILED DESCRIPTION OF THE PREFERRED EMBODIMENT

Figure 1:
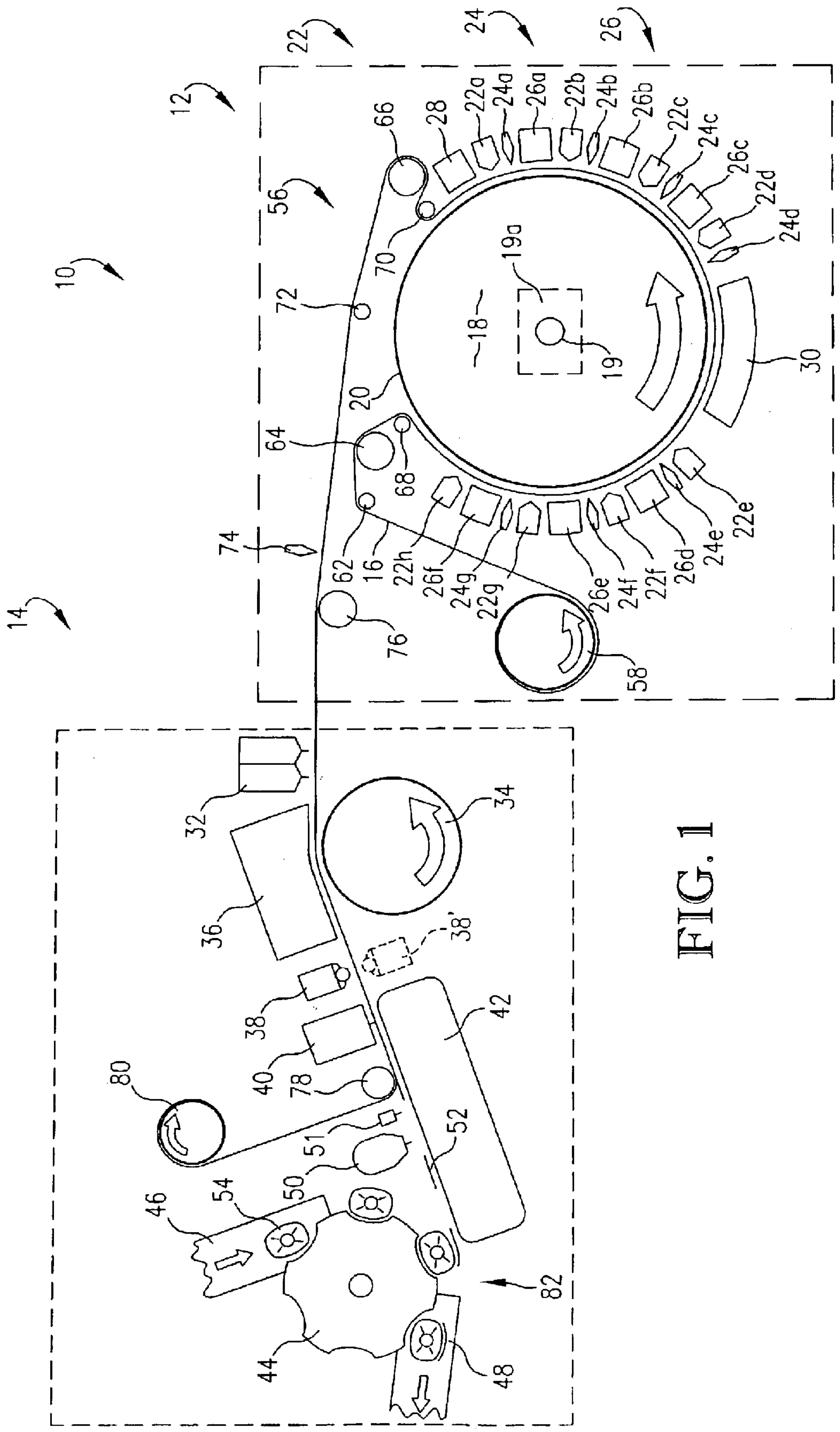
FIG. 1 is a schematic representation of the improved digital web printing, adhesive application, laser cutting and labeling apparatus of the invention, particularly designed for the on-demand production and application of labels to end products.

Turning now to the drawings, and particularly FIG. 1, a web printing and labeling apparatus 10 is illustrated in a configuration especially adapted for the production and application of product labels. The apparatus 10 includes a digital print-ing assembly 12 and a downstream web cutting, handling and application assembly 14. The apparatus 10 is designed to accept a continuous web 16 and to print individual images (e.g., labels) on the web 16, followed by adhesive application, laser cutting of labels and application of cutting and the cut labels. A feature of the invention is the use of a digital printing assembly and a relatively large impression drum 18, thereby permitting use of lightweight, thin, relatively low cost webs.

Figure 3:
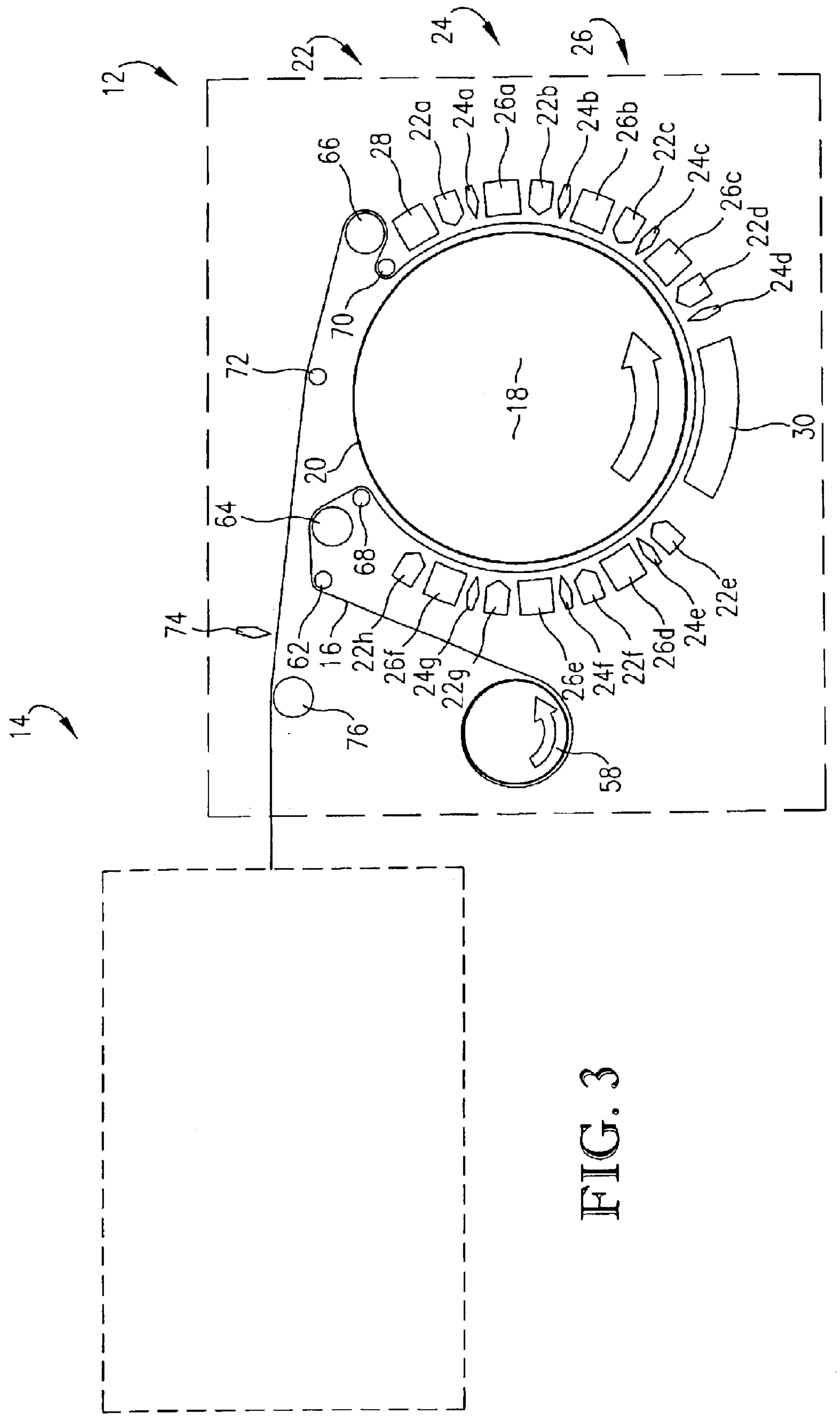
FIG. 3 is a view similar to that of FIG. 1, but illustrating in enlarged format the upstream web printing portion of the FIG. 1 apparatus.

In more detail (see FIG. 3), the printing assembly 12 includes a relatively large (at least about 3 feet in diameter and more preferably from about 4–6 feet in diameter) impression drum 18 presenting an outer surface 20. The drum 18 is mounted for controlled rotation in either direction, i.e., clockwise or counterclockwise, by means of servo-driven gearless electronic drives (in this content "gearless" refers to the fact that the drum 18 does not have a peripheral gear as is common with typical gear train-driven drums). Thus (see FIG. 1), the drum 18 is rotatable on a central shift 19, which is coupled with a servo-drive 19*a*. Furthermore, the drum is provided with internal passageways for cooling media such s chilled water or the like. The overall assembly 12 further includes at least one, and preferably a plurality of digital print heads 22. As shown in FIG. 1, a total of eight print heads 22*a*–22*h* are provided in circumferentially spaced relationship about and adjacent to surface 20 of drum 18. The print heads 22 can be any one of a number of digitally operated devices, such as inkjet, electrophotographic, ion deposition, elcographic, magnetophotographic, direct thermal, thermal transfer, and digital offset print heads. It will be appreciated that each such print head is individually driven and electronically controlled, which may include a servo-drive if needed.

In preferred practice, most of print heads 22 have an associated photosensor 24, in the case of FIG. 1, sensors 24*a*–24*g*. Similarly, the print heads have adjacent UV or EB (electron beam) curing devices 26, as shown in FIG. 1, the devices 26*a*–26*f*. Finally, it will be observed that additional UV/EB curing devices 28 and 30 are located about the periphery of drum 18.

Figure 2:
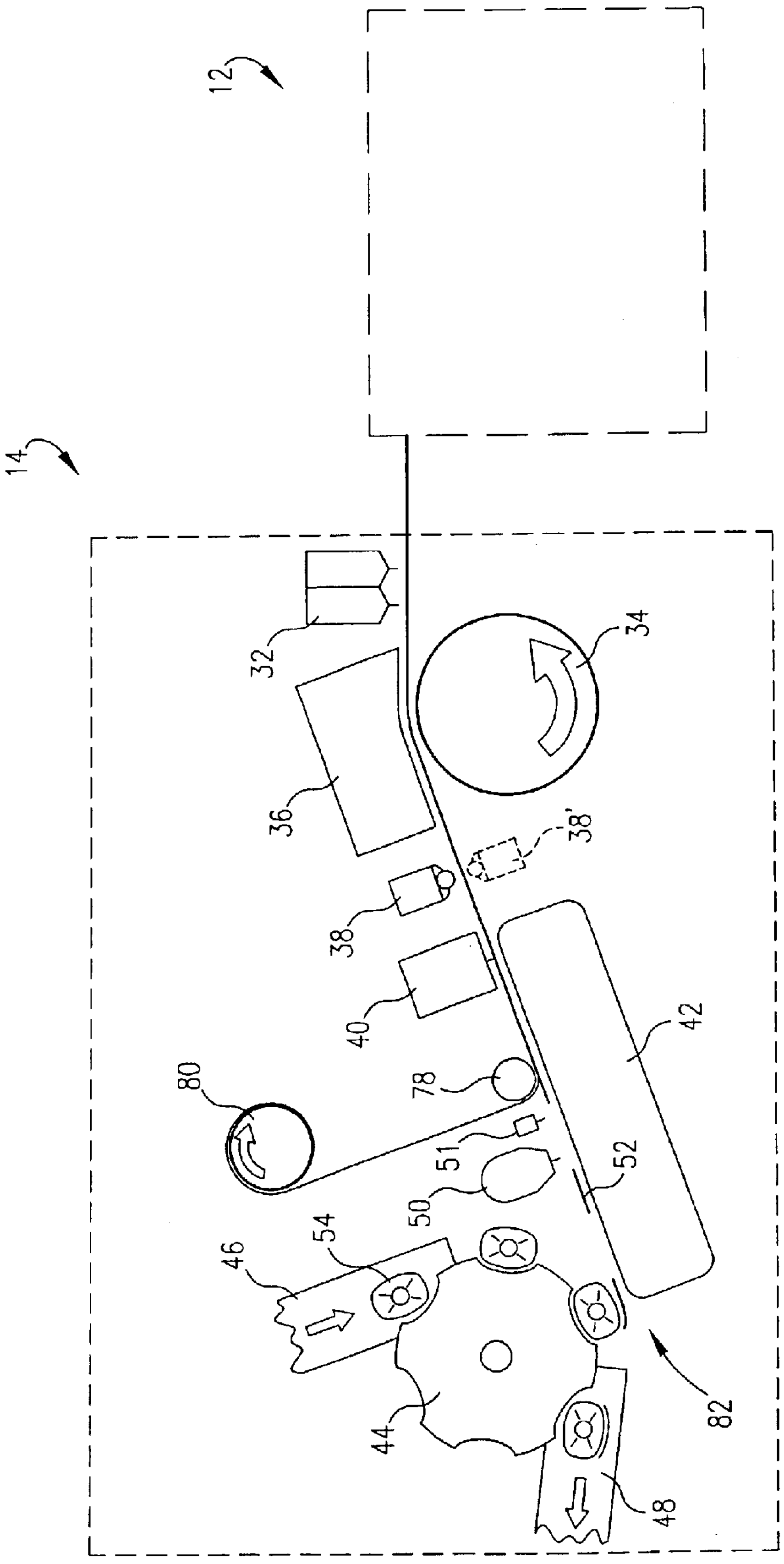
FIG. 2 is a view similar to that of FIG. 1, but illustrating in enlarged format the downstream web handling and labeling portion of the FIG. 1 apparatus.

The web cutting and labeling assembly 14 (see FIG. 2) includes a digitally operated adhesive application device 32, which can provide either sequential application of the adhesive or flood-coating as desired. A rotatable chill roller 34 is located downstream of device 32, and has an opposed UV/EB or other curing/driving curing device 36. A scanning camera (typically a CCD camera) 38 is located downstream of the chill roller 34. Similarly, a conventional laser cutter 40 is disposed downstream of the roller 34 but on the opposite side of web 16 as illustrated.

The labeling portion of assembly 14 includes a vacuum-type label conveyor 42 as well as an adjacent, rotatable, product labeling star wheel 44, the latter having an input conveyor 46 for delivery of unlabeled products to the star wheel 44, and an opposed output conveyor 48 for take away of labeled products. An optional EAS (electronic article surveillance) device 50 is located along the length of conveyor 42 and upstream of star wheel 44, in order to apply or print an RFID tags or other identifying indicia to laser cut labels 52 prior to application thereof. A sensor 51 associated with device 50 is employed to assure that the EAS tags are applied only to properly cut labels. As explained more fully below, the finished labels are applied to products 54 coming into and out of star wheel 44.

The overall printing assembly 12 further includes a web guidance system 56 which is operable to guide web 16 around at least a portion of drum surface 20 and between the latter and print head(s) 22 for printing of the outer face of web 16 with a series of label images; the system 56 also serves to guide the printed web into and through the assembly 14. In detail, the guidance system 56 includes a pair of alternately usable unwind rollers 58 and 60 (see FIG. 4), a support roller 62, and a pair of servo-driven rollers 64, 66 located on opposite sides of the drum 18. An infeed nip roller 68 is positioned adjacent servo roller 64 and forms, with surface 20, an infeed nip with web 16. In like manner, an exit nip roller 70 is located adjacent servo 66, and forms with surface 20 an exit nip for web 16. In preferred practice, the system 56 also includes one or more additional support rollers 72, photosensor 74 and an additional, optionally usable, heatable laminating roller 76. Finally, the system 56 includes a matrix nip roller 78 adjacent and upstream of applicator 50, together with a matrix web takeup roller 80.

Although not shown in detail, it will be appreciated that the operation of apparatus 10 is microprocessor controlled. That is, the sensors 24 and 74, camera 38, print heads 22, curing devices 24, 28 and 30, device 32, laser cuter 40 and the drum 18, as well as conveyor 42, star wheel 44, EAS device 50 and sensor 51 are all operatively coupled with microprocessor(s). Such microprocessor operation is controlled via known software, such as that commercialized by Wave Front Technologies of Irvine, Calif.

In the ensuing discussion, the operation of apparatus 10 for label production and application will be explained; it should be understood, however, that the apparatus 10 may be used in production and application of other printed articles.

In the course of preparing labels using the apparatus 10, a starting web roll is mounted on unwind roller 58 and is threaded around rollers 62, 64 and 68, and about the surface 20 of drum 18. The web is further trained around rollers 70 and 66, and over rollers 72 and 76. Finally, the web is trained about nip roller 78 for ultimate takeup on matrix takeup roller 80. During the printing and labeling operation, the drum 18 is rotated at a predetermined speed and the web guidance system 56 is operated to likewise move the web 16 around the drum 18 and through the remainder of the apparatus 10. In this connection, it is desired that the speed of drum surface 20 be essentially equal to the linear speed of the web 16, i.e., there is essentially no relative movement between the surface 20 and web 16 between the nip rollers 68, 70. This is ensured through control of the rotational speed of drum 18, and control of web speed via system 56. In the latter case, the servo rollers 64, 66 provide on-the-go tension and speed control for the web 15. As the web 16 traverses the web surface 20 between the nip rollers 68, 70, the print heads 22*a*–22*h* are operated to successively print label images onto the outer surface of the web. As will be readily understood, each of the heads can be designed for printing a respective color so that the final printed images may be multi-colored to any desired extent. The operation of the print heads is controlled via the sensors 24. In the usual practice, web 16 is provided with fiducials or other eye marks adjacent or associated with the image-bearing regions of the web, and these are sensed by the sensors 24 so as to insure proper registration between the printing performed by each of the printing heads. In order to provide the highest quality printing, the individual curing devices 26, 28, 30 are also operated during rotation of drum 18. This serves to at least partially dry and cure images or parts thereof deposited by the respective digital print heads 22.

As the web 16 leaves drum 18, it has printed thereon the desired spaced label images. The web then traverses the rollers 72, 76 with intermediate sensing by sensor 74. Next, the web enters assembly 14 and is adhesive coated by device 32. In this connection, a feature of the invention is the ability to print on a face of the web 16 and then apply adhesive over the printing. This serves to "bury" the image so as to produce a higher quality label. As indicated previously, device 32, under microprocessor control, can be used to apply adhesive only to regions of the label images, or alternately, the web surface may be flood-coated.

After adhesive application, the web 16 proceeds through a station defined by chill roller 34 and opposed curing device 36. This serves to fully cure and dry the adhesive applied upstream by the device 32.

Next, the printed label images are scanned by camera 38 so as to insure that they are all of appropriate quality. All such approved images are next laser cut using the cutter 40 and proceed to EAS device 50 for application of an identifying tag or the like; as noted above, the operation of device 50 is monitored by sensor 51, to ensure that tags are applied or printed only to properly cut labels. This produces a series of individual labels 52 which are picked up by the vacuum operation of conveyor 42 for conveyance to star wheel 44. At the same time, the uncut remainder of the web 16, in the form of a matrix 16*a*, is taken up by takeup roller 80.

The individual labels 52 carried by conveyor 42 proceed to the area of star wheel 44 where such labels are applied to the products 54. In particular, it will be observed that the star wheel 44 is operated in timed relationship with the conveyor 42, so that the presentation of the individual products 54 at label applying location 82 coincides with presentation and release of an individual label 52. In this fashion, each of the articles 54 is sequentially labeled at the location 82.

In the event that one or more label images of inferior quality are detected by camera 38, the microprocessor controller signals laser cutter 40 to not cut such inferior label images. Therefore, such inferior images form a part of the matrix web 16*a* and are collected on takeup roller 80 along with the cut matrix. By the same token, the operation of star wheel 44 would be stopped temporarily until acceptable cut labels 52 are again ready for application to products.

Figure 4:
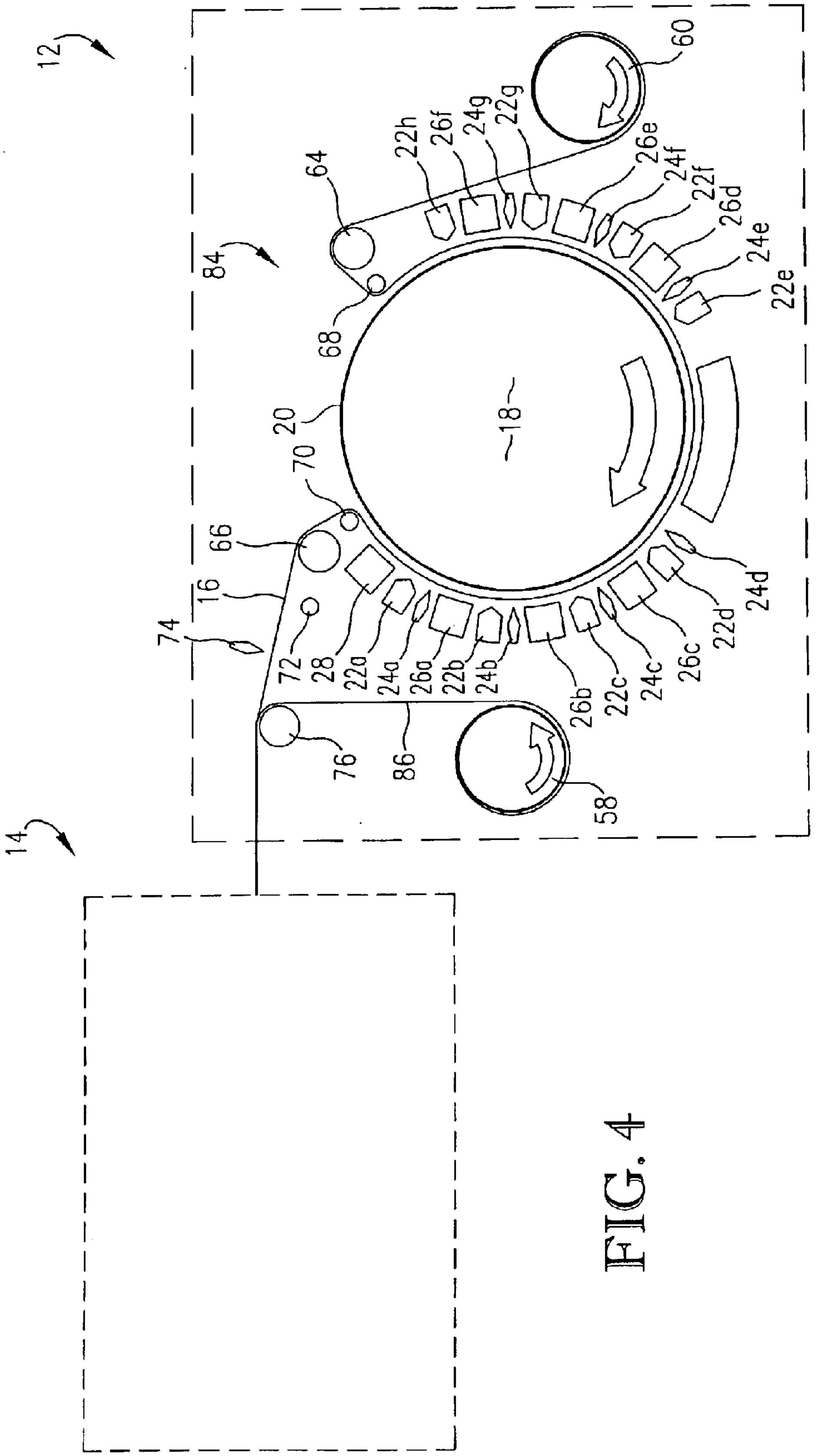
FIG. 4 is a schematic representation of another type of digital web printing and labeling apparatus in accordance with the invention, illustrating an alternate path of travel for the continuous web permitting reverse side digital printing, and/or application of clear laminate over digital printing.

FIG. 4 depicts an apparatus 84 very similar to apparatus 10 and including a printing assembly 12 and a laser web cutting and labeling assembly 14. For ease of discussion, like components will be similarly numbered between FIGS. 1 and 2. It will be seen, however, that the web 16 noted on alternate unwind roller 16 and thus proceeds an opposite direction about surface 20 of drum 18. By the same token, in this embodiment, the drum 18 is rotated in a clockwise direction, as compared with the counter-clockwise direction of FIG. 1. Use of the alternate unwind roller 60 allows the opposite side of web 16 to be printed, as compared with the FIG. 1 embodiment. Also as shown in this embodiment, laminating web 86 may be applied to the printed face of web 16 prior to entrance thereof into the assembly 14. To this end, the web 86 is mounted on primary unwind roller 58 and is applied by heating of laminating roller 76.

The operation of apparatus 84 proceeds in exactly the same fashion as that described with reference to FIG. 1, with the exception that the laminating web 86 is applied to the printed face of web 16.

Figure 5:
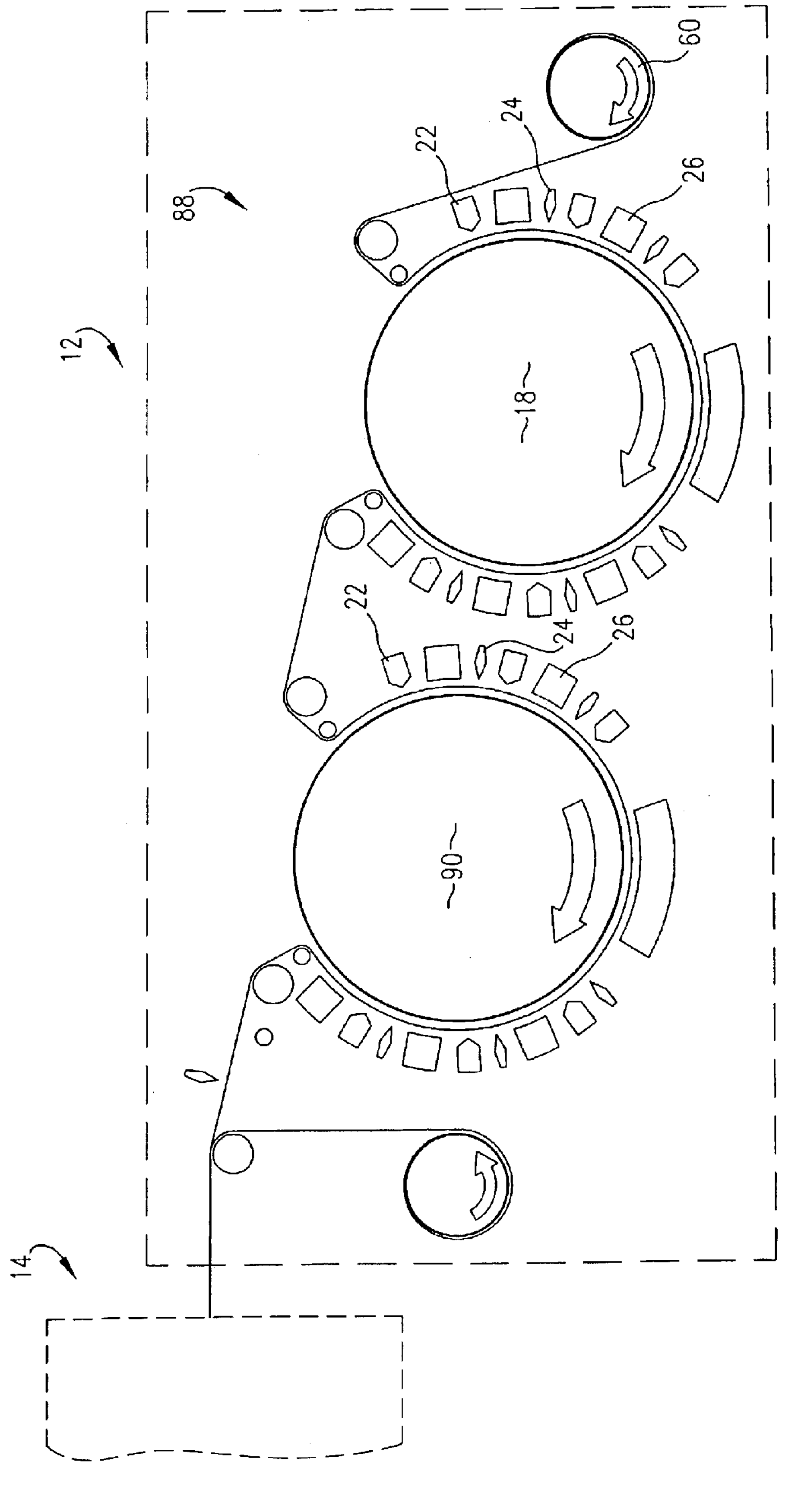
FIG. 5 is a schematic representation of another embodiment of the invention, wherein the printing assembly makes use of a pair of serially related, servo-driven gearless impression drums.

FIG. 5 illustrates a still further apparatus in accordance with the invention which is very similar to that shown in FIG. 4. However, in this case, an additional printing drum 90 with associated print heads 22, sensors 24, and UV/EB curing devices is provided in the web path, prior to entrance of the web into the cutting and handling assembly 14. The purpose of the additional drum 90 and associated devices is to permit high speed operation through greater printing capacity. Also, the additional print head allow further colors to be applied, as compared with use of only a single printing drum.

Figure 6:
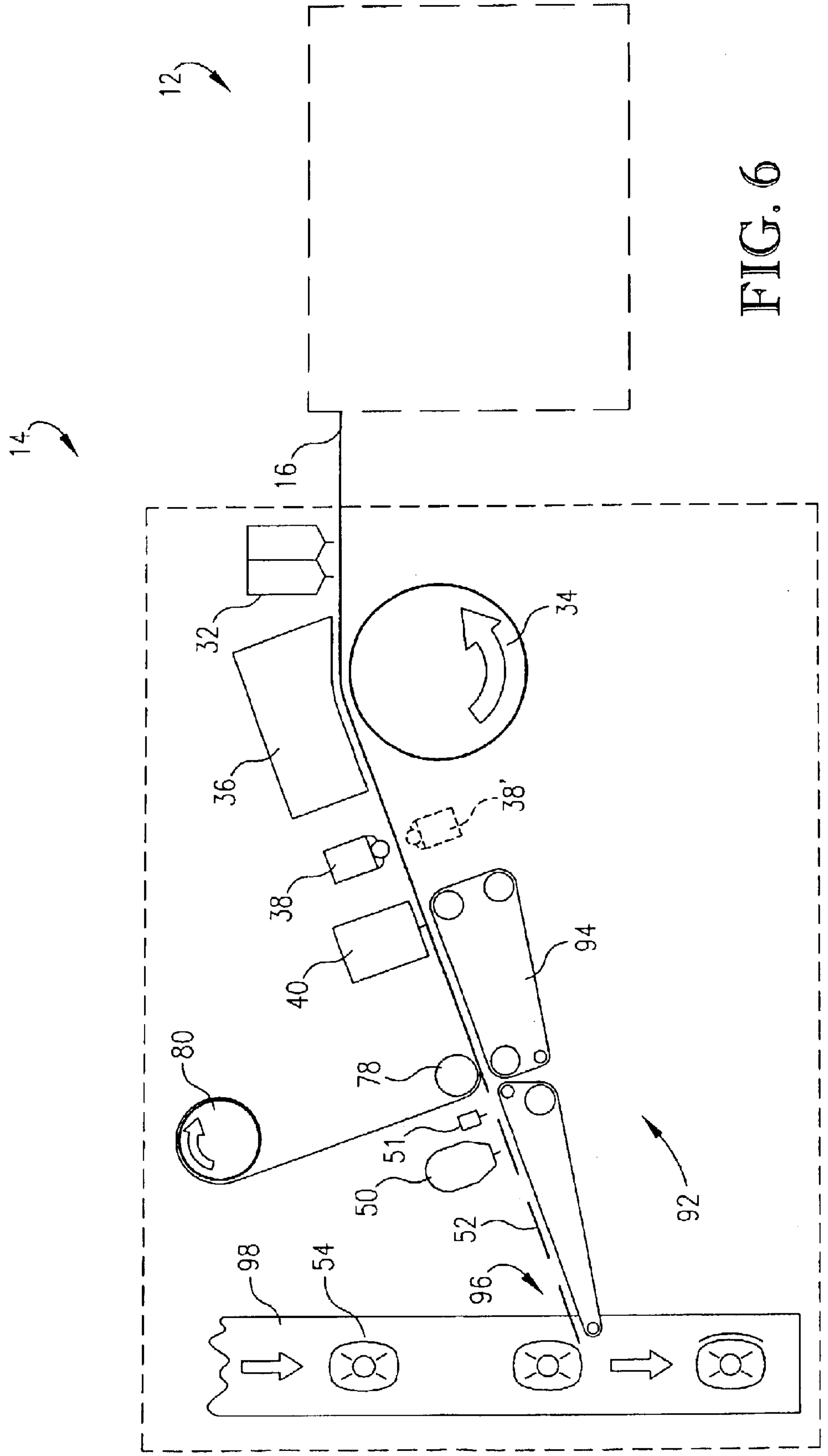
FIG. 6 is a schematic representation of a still further embodiment of the invention, depicting another type of labeling apparatus, as compared with the embodiments of FIGS. 1–5.
Figure 7:
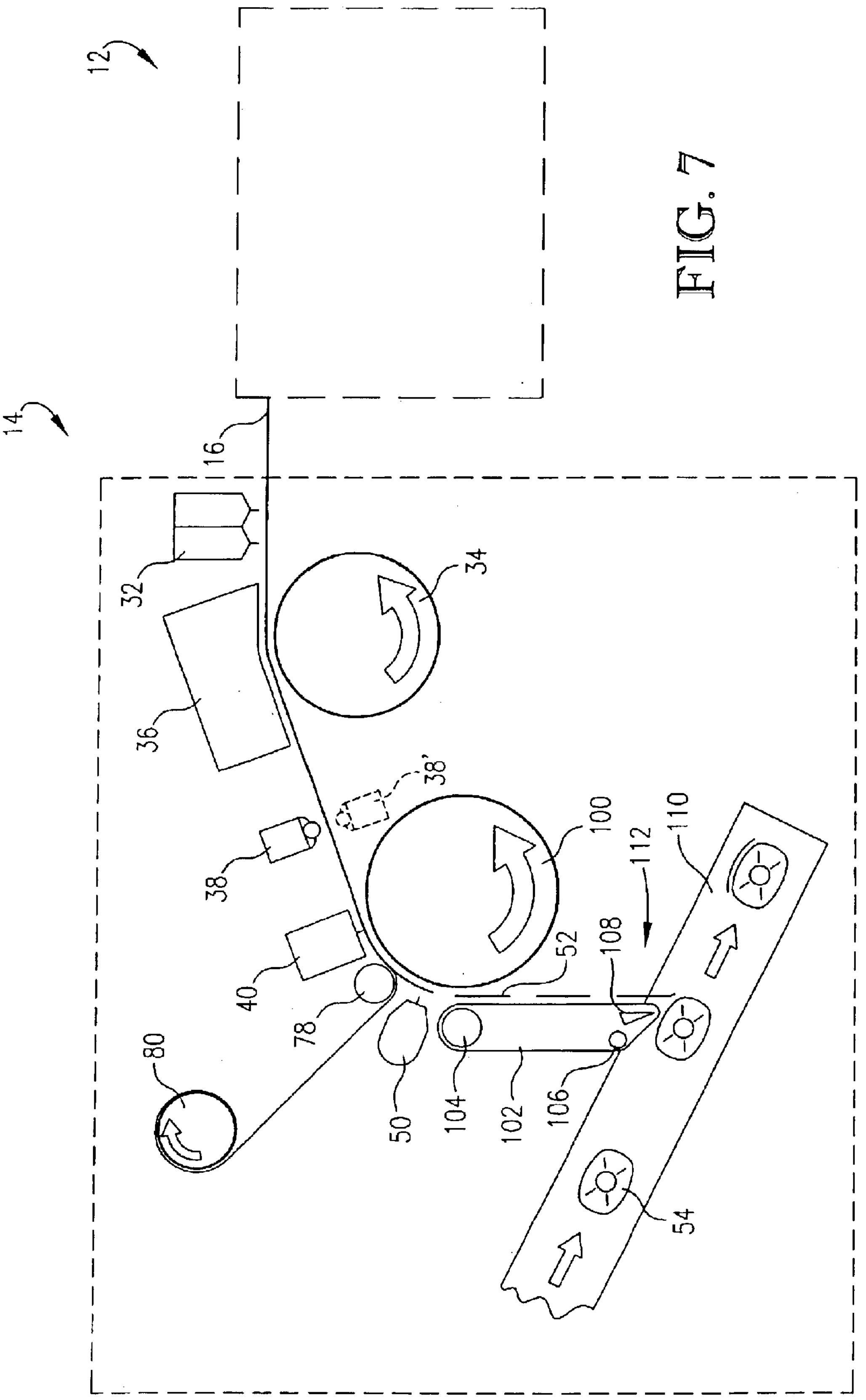
FIG. 7 is a schematic representation of a still further embodiment of the invention, depicting another type of labeling apparatus, as compared with the embodiments of FIGS. 1–6.
Figure 8:
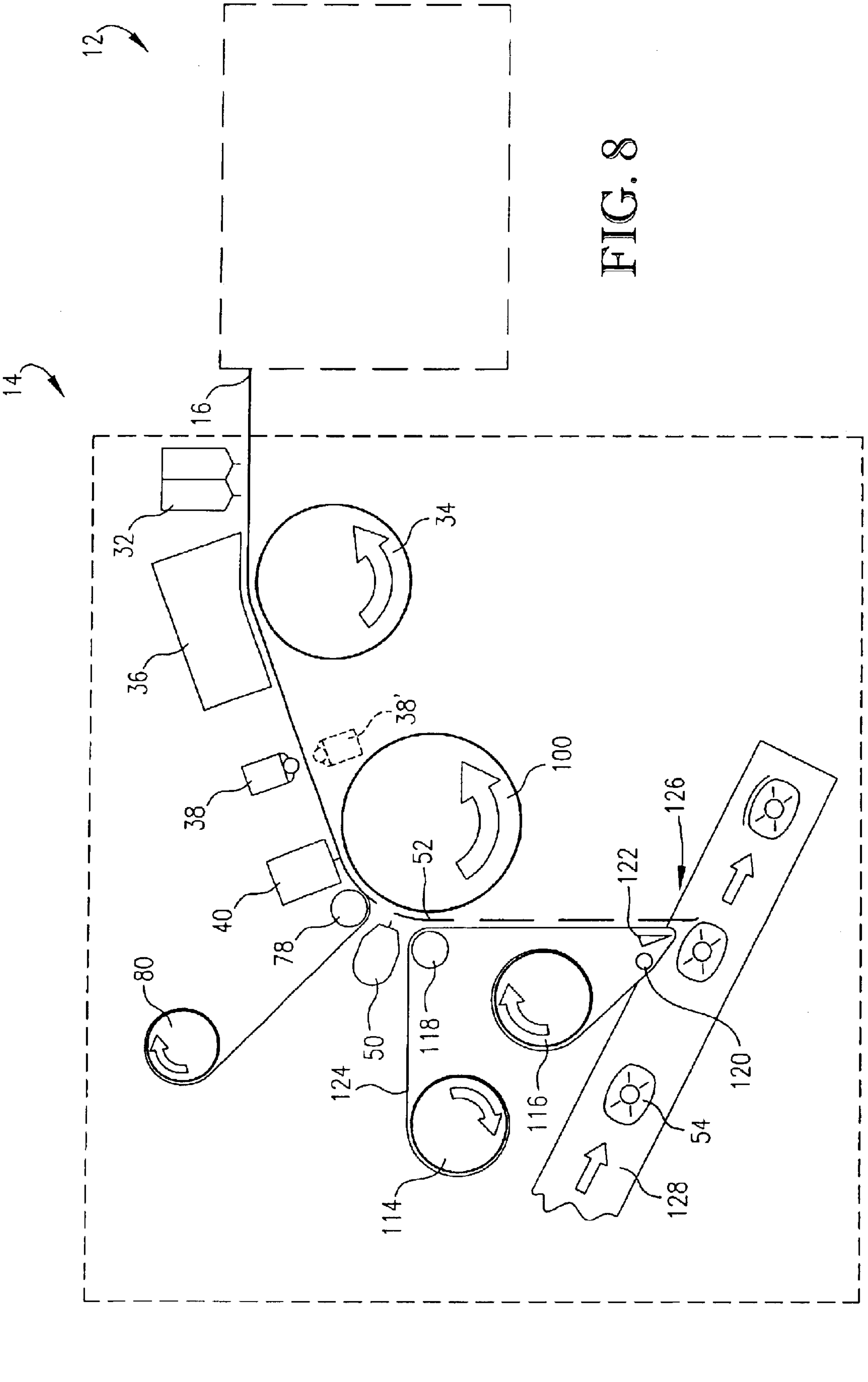
FIG. 8 is a schematic representation of a still further embodiment of the invention, depicting another type of labeling apparatus, as compared with the embodiments of FIGS. 1–7.

FIGS. 6, 7 and 8 depict additional embodiments with different types of label-applying apparatus; in each case, use may be made of upstream printing apparatus 12 of any of the previous embodiments, or for that matter other embodiments within the scope of the invention. In each of FIGS. 6–8, like components from the earlier embodiments are identically numbered and are not further described.

Turning first to FIG. 6, a label-applying assembly 92 includes a vacuum or static electric conveyor 94 which extends from a point adjacent cutter 40 past roller 78 and applicator 50, to a label-applying station 96. A conveyor 98 carrying individual, spaced apart products 54 intersects with the end of conveyor 94 as shown. In the case of FIG. 7, a secondary vacuum roller 100 is provided downstream of cutter 40 and roller 78, and it will be seen that the labels 52 are conveyed by the roller 100 to a pickup conveyor belt 102, which again may be vacuum operated or a static electric belt. The belt 102 is trained around rollers 104, 106 and elongate applicator tip 108. A product conveyor 110 carrying individual products 54 intersects with the end of belt 102 remote from roller 100. In use, cut labels 52 are released by roller 100 at the juncture thereof with belt 102, and the latter serves to convey the individual labels to a label applying station 112. At this point, the labels 52 are applied to respective products 54. Finally, in FIG. 8, an unwind roller 114 and takeup roller 116 are provided, with a intermediate roller 118 therebetween, the latter oriented close to vacuum roller 100. A support roller 120 and applicator tip 122 are positioned adjacent roller 116 as shown. A liner web 124 from a supply thereof extends from roller 114 and is trained about intermediate roller 18, tip 122, roller 120 and is finally taken up on roller 116. When the web 124 is fully wound on roller 116, it can be transferred to roller 114 for reuse. In practice, cut labels 52 are conveyed by the roller 100 as in the case of the FIG. 7 embodiment, but are transferred to the web 124 to the label-applying station 126. At this point, the products 54, conveyed by conveyor 128, are labeled as shown in FIG. 8.

The apparatus and methods of the invention allow the user to produce variable, on-demand, on-the-go graphics and apply high quality labels or other images using relatively low cost web material. That is, inasmuch as the web 16 is printed while traversing the drum 18 (and drum 90 in the case of FIG. 5), the web is fully stabilized during the printing operation.

The speed of the web is consistent with the speed of the drum due to the web being in contact with the drum's surface. Only a small amount of tension is applied to the web during travel thereof past the digital printing stations while the web's in contact with the drum. This is to in contrast with conventional in-line systems wherein material with greater internal tensile values, which increases thickness and/or cost, must be employed in order to avoid web breakage or elongation during web travel through the in-line printing and converting process. Furthermore, the use of microprocessor-controlled digital print heads allow for consistent high quality printing over a wide range of speeds.

While the foregoing embodiments depict the use of webs with adhesive application during processing, webs previously coated with a cured, activatable adhesive could also be employed, thus eliminating the need for in-line adhesive application.

We claim:

1. A method of handling a continuous web with images printed thereon and applying such images to products comprising the steps of:

providing an adhesive application device;

guiding said web past said adhesive application device and applying adhesive to said web;

scanning said images to determine the quality of each individual image;

cutting said images from said web using a laser cutting device thereby producing a stream of labels and a waste matrix, said cutting step comprising selectively cutting said images from said web based on the image quality detected during said scanning step with any uncut images being taken up as a part of said waste matrix;

transporting said labels to an application station;

conveying products to said application station; and applying said labels to the products at said application station.

2. The method of claim 1, said adhesive application step comprising sequentially applying adhesive over at least a portion of said images.

3. The method of claim 1, further comprising an adhesive curing step comprising guiding said web through a curing station defined by a chill roller and an opposed curing device.

4. The method of claim 3, said curing device selected from a member of the group consisting of UV and electron beam curing devices.

5. The method of claim 1, including the step of applying an identifying indicia to said labels.

6. The method of claim 5, said identifying indicia being an RFID tag.

7. The method of claim 1, said transporting step comprising transferring said labels to a vacuum or static electric conveyor for transportation to said application station.

8. The method of claim 1, said product conveying step comprising conveying said products to a rotatable star wheel configured for receiving individual products and moving such products into said application station for application of labels thereto, and for thereafter moving the products away from the station.

9. The method of claim 1, said product conveying step comprising conveying said products on a generally rectilinear conveyor into said application station, said conveyor further operable to move said products away from the station after application of labels thereto.

10. A method of handling a continuous web with images printed thereon and applying such images to products comprising the steps of:

scanning said images to determine the quality of each individual image;

cutting said images from said web using a laser cutting device thereby producing a stream of labels and a waste matrix; and transporting said labels to an application station, said image cutting step comprising selectively cutting said images from said web based on the result of said scanning step with any uncut images being taken up as a part of said waste matrix.

11. The method of claim 10, said method further comprising the steps of conveying products to said application station and applying said labels to the products at said application station.

12. The method of claim 10, said method further comprising the step of applying to said labels an identifying indicia.

13. The method of claim 12, said identifying indicia being an RFID tag.

* * * * *